United States Patent Office 3,538,059
Patented Nov. 3, 1970

3,538,059
PROCESS FOR MAKING BETA-LACTAM POLYMERS
Claus Beermann, Neu-Isenburg, Erwin Schmidt, Frankfurt am Main, and Walter Rupp, Niederhofheim, Taunus, Germany, assignors to Farbwerke Hoechst Aktiengesellschaft vormals Meister Lucius & Bruning, Frankfurt am Main, Germany, a corporation of Germany
No Drawing. Continuation-in-part of applications Ser. No. 518,988 and Ser. No. 519,016, Jan. 6, 1966. This application Nov. 13, 1968, Ser. No. 775,514
Claims priority, application Germany, Jan. 7, 1965, F 44,889, F 44,890
The portion of the term of the patent subsequent to Dec. 17, 1985, has been disclaimed
Int. Cl. C08g 20/10
U.S. Cl. 260—78                                    19 Claims

ABSTRACT OF THE DISCLOSURE

A process for making beta-lactam homopolymers and copolymers is disclosed which provides an improved control of the degree of polymerization and the distribution of molecular weight. In the case of the copolymers, it makes possible a statistical distribution of monomeric units with monomers having substantially different reaction rates. The beta-lactams used have a hydrogen atom at the nitrogen atom thereof and from 0 to 4 substituents on the alpha and/or beta carbon atoms thereof. Polymerization may be effected at a temperature of $-15°$ to $120°$ C. by anionic polymerization in a polymerization reaction mixture comprising a solution or dispersion of a basic catalyst in an inert solvent. The desired control is achieved by feeding the lactam monomer incrementally and slowly to the polymerization reaction mixture, i.e., at a rate substantially equal to the rate at which it reacts to form the polymer.

---

The present invention relates to a process for preparing lactam homoploymers and copolymers. This application is a continuation-in-part of our prior applications Ser. Nos. 518,988 and 519,016 both filed on Jan. 6, 1966, now abandoned.

In the anionic polymerization of lactams according to known methods, a basic catalyst and, if desired or required, a chain starting agent, are added to the lactam. At a certain temperature, which depends on the nature of the starting monomers used, polymerization is initiated and proceeds until a certain degree of conversion is attained, whereupon it slowly ceases. In general, beta-lactams are also polymerized according to the same principle in a homogeneous phase or in dispersion. In such polymerizations it is customary to use solvents which dissolve the lactam and swell or dissolve the polymer that forms.

When proceeding in this manner it is often difficult, because of the heat of the reaction, to control the polymerization which sets in. It is also difficult to influence the distribution of the molecular weight of the polymers formed. Moreover, in the case of copolymers, if the polymerization rates of the lactam monomers are very different, a non-homogeneous product is obtained having the character of a block copolymer. Using known processes copolymers with a statistical distribution of the different monomeric units in each individual chain molecule is possible only if the monomeric lactams used polymerize under the same conditions at substantially the same speed.

The present invention is based on the discovery that the aforesaid disadvantages can be avoided and that beta-lactam polymers having a regulated distribution of molecular weight, and in the case of copolymers a statistical distribution of monomeric units, can be obtained by establishing a polymerization reaction medium comprising an inert solvent solution or dispersion of a basic catalyst and adding thereto the lactam or lactams to be polymerized, incrementally i.e., either continuously or in small increments, at a relatively slow rate. The feed rate should be slow enough to prevent any substantial accumulation of unreacted monomers in the reaction medium and is desirably substantially equal to the rate at which the monomers are consumed in the polymerization reaction. In cases where copolymers are to be made from beta-lactams having different reaction rates, the feed rate is adjusted in relation to the slowest reacting monomer to avoid accumulation of unreacted monomer in the reaction medium. When the quantities employed are small, drop-by-drop addition of the monomers may be used. It has been found that generally the monomer or monomer mixture should be fed to the polymerization reaction medium over a period of at least about 45 minutes.

It is surprising that the degree of polymerization and the distribution of the molecular weight can be modified to a very large extent in the desired way by slowly adding the monomer at the same rate at which it is consumed, to a solution or dispersion of the basic catalyst during the polymerization instead of combining the total amount of monomer from the beginning in a definite ratio with the catalyst. The former method of operation has the following advantages over the known methods of polymerizing beta-lactams:

(1) The degrees of polymerization that can be obtained are much higher than those that can be obtained by the known processes.

(2) The distribution of the molecular weight can be modified within very wide limits in the desired way.

(3) Even in cases in which relatively large quantities of material containing quickly polymerizing beta-lactams are involved, it is not difficult to dissipate the heat during the polymerization process, since the speed at which the monomer is added can be regulated in the desired way to control the rate of heat generation.

(4) Since according to the invention lactam and catalyst are introduced separately into the reaction vessel, even if the polymerization is carried out in disperse phase, mixing devices which clog easily during the polymerization, in particular in cases in which quickly polymerizing beta-lactams are present, and which must be thoroughly cleaned between each run in the usual polymerization process, can be dispensed with when the lactam is fed to the catalyst solution according to the present invention.

(5) In the case of copolymers, by feeding two or more lactams, either separately or in admixture with one another, and in a predetermined ratio, sufficiently slowly to the reaction mixture, copolymers having a statistical distribution of monomeric units are obtained, even though the polymerization rates of the several monomers differ substantially.

(6) By feeding the monomer or monomers at the same rate as that at which they polymerize, a constant ratio of chain-starting and chain-interrupting reactions can be established over the reaction period. In this way the distribution of molecular weight can be modified and polymers with a narrow and uniform distribution of molecular weight obtained.

According to the process of the invention there may be polymerized all beta-lactams which are unsubstituted at the nitrogen atom and carry, in the alpha- and beta-positions with respect to the carbonyl group from zero to four substituents containing a total of up o 12 aliphatically bound carbon atoms or an aromatic radical and up to 9 aliphatically bound carbon atoms for a total of 15 carbon atoms. As indicated below, the substituent carbon atoms may comprise a ring including the alpha and beta carbon atoms of the lactam.

Suitable lactams are, for example, azetidinone, 4-methyl azetidinone, 4-isopropyl azetidinone, 4-vinyl azetidinone, 4-phenyl azetidinone, 4-methyl-4-phenoxymethyl azetidinone, 4-chlorophenyl azetidinone, 3,3-dimethyl azetidinone, 3,4-dimethyl azetidinone, 4,4-dimethyl azetidinone, 4-methyl-4-neopentyl azetidinone, 3,3,4,4-tetramethyl azetidinone, 4-(4'-isopropyl cyclohexyl)-azetidinone or polycyclic lactams of the constitutions

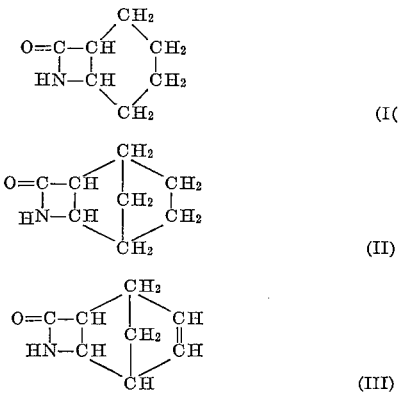

Mixtures of beta-lactams containing up to 50% of higher lactams, for example, alpha pyrrolidone, can also be used in the process of the invention.

Polymerization is carried out according to the anionic reaction mechanism using a solution or dispersion of a basic catalyst. It is catalyzed in usual manner by the addition of alkaline compounds producing lactam anions in the polymerization batch. Suitable substances are, for example, the alkali metal compounds of beta-lactams, the potassium salt of pyrrolidone, the sodium salt of ε-caprolactam, phenyl sodium, lithium hydride and other catalysts used in anionic lactam polymerization.

If desired, chain starting agents such as N-acyl or N-sulfonyl compounds of lactams can be used in known manner. It is likewise possible to produce the chain starting agent in the polymerization batch by adding acylating or sulfonating reagents.

In general, anionic polymerization is carried out at a temperature in the range of from $-15°$ C. to $+120°$ C.

The process according to the invention permits a much greater modification of the degree of polymerization and of the molecular weight distribution than known processes. A different distribution of the molecular weight can be obtained, for example, by first introducing, in one case, an acyl lactam active as chain starting agent, and, in another case, feeding it together with the monomer. According to the latter method products can be obtained having an especially broad molecular weight distribution. When, simultaneously with the lactam, chain starting agents and a metered small amount of chain interrupting agents, for example water, are added, products are obtained, the molecular weight distribution of which is not so broad. The properties of the polymer that is formed can also be modified by the feed rate or the amount of catalyst. It is especially advantageous to regulate the feed rate in such a manner as to prevent the building up of a concentration of unreacted monomer in the reaction vessel.

The polymerization process according to the invention can be carried out in most of the customary organic solvents. It is particularly advantageous to use solvents which are capable of swelling or dissolving the forming polymer, for example, dimethyl sulfoxide, tetramethylene sulfone, phosphoric acid tris-dimethyl amide, dimethyl formamide or methyl pyrrolidone. In these solvents the highest degrees of polymerization are obtained.

Owing to the fact that towards the end of the monomer addition the reaction mixture becomes more and more viscous and may finally solidify to a gel, considerable mechanical effort may be required to achieved uniform distribution of the feed monomer or monomers throughout the reaction mixture. In order to avoid these and other difficulties in the polymerization, the catalyst solution is preferably emulsified in a different second solvent with which it is essentially immiscible or miscible to only a limited extent so that two separate solvent phases are formed. As outer phase solvents there can be used, for example, those that are practically immiscible or incompletely miscible with the lactam and the solvent of the catalyst solution. As a dynamic equilibrium exists between the droplets of an emulsion, the lactam being fed gradually infiltrates in disperse form into the entire inner phase and finally it is completely polymerized. Owing to the fact that this distribution process may be too slow, especially with more rapidly polymerizing beta-lactams, droplets in which the polymerization takes place may be depleted of monomers so that very different products can be obtained depending on the stirring speed and the size of the droplets. Finally, after a certain conversion, the exchange of material between the droplets of a polymerization emulsion may come to a standstill (cf. Houben-Weyl, Methoden der Organ. Chemie, 4th edition, volume 14/1, p. 409).

It is, therefore, particularly advantageous to use as the outer phase solvents that are incompletely miscible with the catalyst solution and completely miscible with the lactams or lactam mixtures to be polymerized. In such cases the added lactam diffuses in the form of a molecular dispersion through the outer phase into the droplets of the catalyst solution so that the solution equilibrium is obtained very rapidly. In this manner high viscosities can be attained, for example.

Suitable solvents for preparing the catalyst solution, which commonly forms the inner phase, are dimethyl sulfoxide and tetramethylene sulfone. These solvents are incompletely miscible with all disclosed solvents of the outer phase. When aliphatic hydrocarbons are used as outer phase, dimethyl formamide and methyl pyrrolidone are also suitable for the catalyst solution.

As solvents for the outer phase which are miscible neither with the beta-lactams specified above nor with the solvents of the catalyst solution there can be used aliphatic or cyclo-aliphatic hydrocarbons having 5 to 25 carbon atoms.

As solvents for the outer phase which are completely miscible with most of the beta-lactams or the mixtures thereof, but are miscible to a limited extent only with the solvents of the catalyst solution, there can be used, for example, (1) aliphatic ethers having 1 to 5 ether oxygen atoms and 4 to 24 carbon atoms in the molecule;

(2) araliphatic ethers having 1 to 3 ether oxygen atoms, 6 to 24 aliphatically bound carbon atoms and 1 to 3 phenyl rings in the molecule;

(3) araliphatic hydrocarbons with 1 to 3 phenyl rings and 3 to 24 aliphatically bound carbon atoms in the molecule.

Mixtures of the aforesaid solvents may also be used.

In order to produce an emulsion that is as fine as possible and especially favorable for polymerization reaction, it is advantageous to add to the polymerization reaction medium emulsifying auxiliaries, such as emulsifiers, protective colloids or thickening agents.

The following examples serve to illustrate the invention but they are not intended to limit it thereto.

EXAMPLE 1

A solution of 100 grams of 4-methyl-azetidinone and 36 milligrams of oxalyl pyrrolidone in 200 cc. of dimethyl sulfoxide was dropped at 20° C., in the course of 1 hour, while stirring intensely, into a dispersion of 2.4 grams of the potassium salt of pyrrolidone in 1500 cc.

of dimethyl sulfoxide. The reaction mixture became more and more viscous and finally solidified in gel form. After another hour the mixture was finally triturated with water, sucked off and dried. 95 grams of a polymer having a relative viscosity of 46.0 (measured at 20° C. in a solution of 1 gram of substance in 100 cc. of concentrated sulfuric acid) were obtained. Similar products were obtained when phosphoric acid tris dimethyl amide was used as the solvent.

When the polymerization was repeated under the same polymerization conditions, the only difference being that all reaction components were combined within one minute, the product obtained had a relative viscosity of 13.5.

EXAMPLE 2

A solution of 3 grams of the potassium salt of pyrrolidone in 600 cc. of dimethyl sulfoxide, to which 6 cc. of 4,4-dimethyl azetidinone were added as a dissolving intermediary, was emulsified in 900 cc. of kerosene boiling within the range of 160° to 180° C. and containing 0.5% of an ethylene-propylene dimethyl sulfamide of the formula $[C_{27}H_{55}SO_2N(CH_3)_2Cl_{1.4}]_n$ and 0.05% of polyisobutylene.

Into the resulting emulsion a solution of 0.15 gram of oxalyl pyrrolidone in 300 grams of 3,4-dimethyl azetidinone was slowly introduced drop by drop in the course of two hours. When the introduction of the solution was terminated stirring was continued for another 4 hours. The fine-grained bead polymer which could well be sucked off was freed from the adhering solvents by being boiled with water. The product (279 grams) had a relative viscosity of 12.8 (measured at 20° C. in a solution of 1 gram of substance in 100 cc. of concentrated sulfuric acid).

When dimethyl formamide was used instead of dimethyl sulfoxide the product obtained had a relative viscosity of 11.8.

When the polymerization was carried out under the same conditions, the only difference being that all reaction components were combined within one minute, the reaction product obtained had a relative viscosity of 7.5.

EXAMPLE 3

A solution of 3 grams of the potassium salt of pyrrolidone in 600 cc. of dimethyl sulfoxide to which 6 cc. of 4,4-dimethyl azetidinone were added as a dissolving intermediary was emulsified in 600 cc. of isopropyl ether which contained 0.5% of an emulsifier of the type described in Example 2. Into the resulting emulsion a solution of 300 grams of 4-methyl azetidinone and 0.15 gram of oxalyl pyrrolidone in 300 cc. of isopropyl ether was introduced drop by drop in the course of 1 hour at 20° C., while stirring vigorously. After washing out and drying the fine-grained reaction product 288 grams of a polymer having a relative viscosity of 23.6 (measured at 20° C. in a solution of 1 gram of substance in 100 cc. of concentrated sulfuric acid) were obtained.

When all reaction components were combined within one minute under otherwise the same conditions, it was impossible, despite intense cooling, to keep the reaction temperature below 50° C. The polymer thus obtained had a relatively viscosity of 5.5.

When all the reaction components were used in quantities corresponding to one-third of the quantities indicated above in this example and when these components were combined within one minute, the reaction temperature could be kept below 30° C. and a polymer having a relative viscosity of 7.5 was obtained.

EXAMPLE 4

A solution of 2 grams of the potassium salt of pyrrolidone in 400 cc. of dimethyl sulfoxide to which 4 cc. of 4,4-dimethyl azetidinone had been added as a dissolving intermediary was emulsified in 400 cc. of isopropyl ether which contained 0.5% of an emulsifier of the kind described in Example 2. Into the resulting emulsion a solution of 200 grams of 4-methyl azetidinone, 0.1 gram of oxalyl pyrrolidone and 0.3 gram of water in 200 cc. of isopropyl ether was introduced drop by drop at 20° C. in the course of one hour, while stirring vigorously. After another hour the fine-grained product was sucked off, boiled with water and dried. 180 grams of a polymer having a relative viscosity of 10.5 (measured at 20° C. in a solution of 1 gram of substance in 100 cc. of concentrated sulfuric acid) were obtained. As the polymer of a relative viscosity of 23.6 which had been obtained according to Example 3 the product obtained according to the present example could be cast into films from a formic acid solution. The two products differed from one another, however, very clearly in the tendency of their solutions to coagulate and in the drawability of the films prepared from them.

EXAMPLE 5

A solution of 0.5 gram of the potassium salt of pyrrolidone and 15 milligrams of oxalyl pyrrolidone in 100 cc. of tetramethylene sulfone was emulsified in 150 cc. of i-dodecyl benzene which contained 0.5% of the emulsifier used in Example 2. Into the resulting emulsion a mixture of 50 grams of 4-vinyl azetidinone and 50 cc. of i-dodecyl benzene was introduced drop by drop at 30° C. in the course of one hour. After another hour the product was sucked off, washed with acetone, triturated with water and sucked off. 48 grams of a polymer were obtained. A solution of 1 gram of the product in 100 cc. of concentrated sulfuric acid had a relative viscosity of 22.3.

EXAMPLE 6

0.02 gram of oxalyl pyrrolidone was added to a dispersion of 0.3 gram of the potassium salt of pyrrolidone in 200 cc. of tetramethylene sulfone. Over a period of 1 hour at 30° C. a mixture of 10 grams of 4-phenyl-azetidinone, 30 grams of 4,4-dimethyl-azetidinone and 20 cc. of tetramethylene sulfone were slowly added dropwise while vigorously stirring. The temperature was kept constant with cooling. The reaction mixture became more and more viscous and, the dropwise addition being terminated, it solidified to a rubber-like gel. The gel was triturated with water, washed with water and dried at 100° C. 30 grams of a copolymer were obtained having a relative viscosity of 10, determined at 20° C. with 1 gram of substance dissolved in 100 cc. of concentrated sulfuric acid.

EXAMPLE 7

A mixture of 30 grams of 4,4-dimethyl-azetidinone, 10 grams of 4-methyl-azetidinone, 0.025 gram of oxalyl pyrrolidone and 100 cc. of dimethyl sulfoxide was dropped over a period of 1 hour at 20° C. and while vigorously stirring into the dispersion of 1 gram of the potassium salt of pyrrolidone in 100 cc. of dimethyl sulfoxide. When the dropwise addition was terminated, the batch solidified. After trituration with water and drying, 35 grams of polymer were obtained having a relative viscosity of 13.0, determined at 20° C. with 1 gram of substance dissolved in 100 cc. of sulfuric acid. The product was soluble without residue in phosphoric acid tris-dimethyl amide and the solution dried to a clear film. A homopolymer of 4-methyl-azetidinone was insoluble in phosphoric acid tris-dimethyl amide.

Instead of dimethyl sulfoxide, phosphoric acid tris-dimethyl amide could be used as solvent in the polymerization, the same result being obtained.

EXAMPLE 8

A mixture of 7.5 grams of 4,4-dimethyl-azetidinone, 7.5 grams of 4-methyl-4-propyl-azetidinone, 20 cc. of dimethyl sulfoxide and 0.03 gram of oxalyl pyrrolidone was dropped over a period of 1 hour and at 20° C. to a solution of 0.4 gram of the potassium salt of pyrrolidone and 1 cc. of 4,4-dimethyl-azetidinone in 130 cc. of dimethyl sulfoxide. The solution became more and more viscous. After 4 hours water was stirred in, the batch was filtered off with suction and dried. 10 grams of polymer were obtained having a relative viscosity of 4.5, determined at 20° C. with 1 gram of substance dissolved in 100 cc. of concentrated sulfuric acid. The product formed a clear solution in methanol. A homopolymer of 4,4-dimethyl-azetidinone was insoluble in methanol.

When N-methyl-pyrrolidone was used as solvent instead of dimethyl sulfoxide, a polymer was obtained having a relative viscosity of 4.0.

EXAMPLE 9

A mixture of 7.5 grams of 4,4-dimethyl-azetidinone, 7.5 grams of 4-methyl-4-propyl-azetidinone, 5 grams of the unsaturated lactam of Formula III and 20 cc. of dimethyl sulfoxide was dropped over a period of 2 hours to a solution of 0.4 gram of the potassium salt of pyrrolidone, 1 cc. of 4,4-dimethyl-azetidinone and 0.03 gram of oxalyl-pyrrolidone in 180 cc. of dimethyl sulfoxide. 13 grams of a copolymer were obtained having a relative viscosity of 7.5, determined at 20° C. with 1 gram of substance dissolved in 100 cc. of concentrated sulfuric acid. The product was clearly soluble in methanol. When all reaction components were rapidly mixed within 1 minute, the polymer obtained formed a strongly turbid solution in methanol. The homopolymers of 4,4-dimethyl-azetidinone and of the lactam of Formula III were insoluble in methanol.

EXAMPLE 10

A mixture of 150 grams of 3,4-dimethyl-azetidinone, 150 grams of 4,4-dimethyl-azetidinone and 0.15 gram of oxalyl-pyrrolidone was dropped over a period of 2 hours and at 20° C. into the vigorously stirred emulsion of a solution of 6 cc. of 4,4-dimethyl-azetidinone, 3 grams of the potassium salt of pyrrolidone and 600 cc. of dimethyl sulfoxide in 900 cc. of heavy gasoline of a boiling range of 160 to 180° C., containing an emulsifying auxiliary 5 grams of polyethylene-propylene dimethyl sulfamide of the composition

and 0.5 gram of polyisobutylene. The granular polymer was filtered off with suction, freed from the solvents used by boiling it with water and dried at 100° C. 270 grams of copolymer were obtained having a relative viscosity of 11.5, determined at 20° C. with 1 gram of substance dissolved in 100 cc. of concentrated sulfuric acid.

When dimethyl formamide was used instead of dimethyl sulfoxide as solvent, a polymer was obtained having a relative viscosity of 10.2.

EXAMPLE 11

A mixture of 90 grams of 4,4-dimethyl-azetidinone, 210 grams of 4-methyl-azetidinone, 0.15 gram of oxalyl-pyrrolidone, 0.2 cc. of water and 300 cc. of isopropyl ether was dropped over a period of 1 hour at 20° C. into a vigorously stirred emulsion of a mixture of 600 cc. of dimethyl sulfoxide, 12 cc. of 4,4-dimethyl-azetidinone, 6 grams of the potassium salt of pyrrolidone, on the one hand, and 1.4 liters of isopropyl ether, on the other, containing 3.7 grams of polyethylene-propylene dimethyl sulfamide as emulsifying auxiliary. After having boiled the granular reaction product with water, 270 grams of copolymer were obtained having a relative viscosity of 9.8, determined at 20° C. with 1 gram of substance dissolved in 100 cc. of concentrated sulfuric acid. Structure analysis under X-rays and differential thermoanalysis indicated that the reaction product was a true copolymer although the two monomeric beta-lactams polymerize with very different speeds. When all reaction components were combined within 1 minute, a non-uniform polymer was obtained.

EXAMPLE 12

A solution of 10 grams of 4-methyl-azetidinone, 5 grams of 4-phenoxymethyl-4-methyl-azetidinone in 15 cc. of dodecyl benzene was dropped at 20° C. and over a period of 1 hour into the emulsion of a solution of 0.4 gram of potassium salt of pyrrolidone, 1 cc. of 4,4-dimethyl-azetidinone and 50 cc. of dimethyl sulfoxide in 75 cc. of dodecyl benzene containing 0.6 gram of an emulsifying auxiliary as used in Example 11. A copolymer was obtained in which the crystal lattice of the 4-methyl-azetidinone homopolymer did no longer occur.

EXAMPLE 13

A mixture of 15 grams of 4-vinyl-azetidinone, 15 grams of 4-methyl-azetidinone and 30 cc. of isopropyl ether was dropped at 20° C. and over a period of 45 minutes into the emulsion of a solution of 70 cc. of dimethyl sulfoxide, 0.6 cc. of 4,4-dimethyl-azetidinone, 0.3 gram of the potassium salt of pyrrolidone and 7 mg. of oxalyl-pyrrolidone in 90 cc. of isopropyl ether containing 0.5% of the emulsifying auxiliary used in Example 12. After having eliminated the adhering solvents, 25 grams of copolymer were obtained having a relative viscosity of 12.4, determined at 20° C. with 1 gram of substance dissolved in 100 cc. of concentrated sulfuric acid. The copolymer had a melting point of 334° C. The homopolymers of the two individual components have higher melting points. The copolymer was soluble in formic acid of 98% strength without residue.

We claim:

1. In a process for producing polymers of beta-lactams having a hydrogen atom at the nitrogen atom thereof and having 0 to 4 substituents on the alpha and beta carbon atoms thereof containing up to 15 carbon atoms which may comprise a ring including said alpha and beta carbon atoms, and up to 50% by weight of higher lactams, by ionic polymerization in a polymerization reaction medium comprising a solution or dispersion of a basic catalyst and at a temperature of —15° to 120° C., the improvement which comprises feeding said lactam or lactams to said polymerization reaction medium slowly at a rate substantially equal to the rate at which it is consumed in the polymerization reaction.

2. In a process for producing polymers of beta-lactams having a hydrogen atom at the nitrogen atom thereof and having 0 to 4 substituents on the alpha and beta carbon atoms thereof containing up to 15 carbon atoms which may comprise a ring including said alpha and beta carbon atoms, and up to 50% by weight of higher lactams, by ionic polymerization in a polymerization reaction medium comprising a solution or dispersion of a basic catalyst and at a temperature of —15° to 120° C., the improvement which comprises feeding said lactam or lactams to said polymerization reaction medium continuously at a rate sufficiently slow to avoid any substantial accumulation of unreacted monomer in the polymerization reaction medium.

3. In a process for producing polymers of beta-lactams having a hydrogen atom at the nitrogen atom thereof and having 0 to 4 substituents on the alpha and beta carbon atoms thereof containing up to 15 carbon atoms which may comprise a ring including said alpha and beta carbon atoms, and up to 50% by weight of higher lactams, by ionic polymerization in a polymerization reaction medium comprising a solution or dispersion of a basic catalyst and at a temperature of —15° to 120° C., the improvement which comprises feeding said lactam or lactams to said polymerization reaction medium incrementally over a period of at least 45 minutes.

4. A process according to claim 1 wherein only one lactam is fed to the polymerization reaction medium to produce a homopolymer.

5. A process according to claim 1 wherein a mixture of lactams is fed to the polymerization reaction mixture to produce a copolymer.

6. A process according to claim 1 wherein a solution of the basic catalyst is used.

7. A process according to claim 6 wherein the catalyst solution is emulsified in a different second solvent which when mixed with the solvent of the catalyst forms two phases.

8. A process according to claim 7 wherein the second solvent is completely miscible with the beta-lactam to be polymerized.

9. A process according to claim 6 wherein the inert solvent of the catalyst is at least one solvent selected from the group consisting of dimethyl sulfoxide, tetramethylene sulfone, phosphoric acid tris-dimethyl amide, dimethyl formamide and N-methyl-pyrrolidone.

10. A process according to claim 7 wherein the inert solvent of the catalyst is at least one solvent selected from the group consisting of dimethyl sulfoxide and tetramethylene sulfone.

11. A process according to claim 7 wherein the inert solvent of the catalyst is at least one solvent selected from the group consisting of dimethyl formamide and N-methyl-pyrrolidone and the second solvent for said catalyst solution is at least one solvent selected from the group consisting of aliphatic and cycloaliphatic hydrocarbons having 5 to 24 carbon atoms in the molecule.

12. A process according to claim 8 wherein the inert solvent of the catalyst is at least one solvent selected from the group consisting of dimethyl sulfoxide, tetramethylene sulfone, phosphoric acid tris-dimethyl amide, dimethyl formamide and N-methyl-pyrrolidone and the second solvent of said catalyst solution is at least one solvent selected from the group consisting of aliphatic ethers having 1 to 5 ether oxygen atoms and 4 to 24 carbon atoms in the molecule, araliphatic ethers having 1 to 3 ether oxygen atoms, 6 to 24 aliphatically bound carbon atoms and 1 to 3 phenyl rings in the molecule, and araliphatic hydrocarbons with 1 to 3 phenyl rings and 3 to 24 aliphatically bound carbon atoms in the molecule.

13. A process according to claim 1 wherein a dispersion of the basic catalyst is used.

14. A process according to claim 13 wherein the catalyst dispersion is emulsified in a different second solvent which when mixed with the solvent of the catalyst forms two phases.

15. A process according to claim 13 wherein the second solvent is completely miscible with the beta-lactam to be polymerized.

16. A process for producing polymers of beta-lactams having a hydrogen atom at the nitrogen atom thereof and having 0 to 4 substituents on the alpha and beta carbon atoms thereof containing up to 15 carbon atoms which may comprise a ring including said alpha and beta carbon atoms, and up to 50% by weight of higher lactams, said process comprising establishing a polymerization reaction medium comprising an inert solvent solution of a basic catalyst, said catalyst solution being emulsified in a different second solvent which when mixed with the solvent of the catalyst forms two phases, feeding one or more of said beta-lactams to said polymerization reaction medium and maintaining said reaction medium at $-15°$ to $120°$ C. to cause said beta-lactams to polymerize.

17. A process according to claim 16 wherein the beta-lactams to be polymerized are completely miscible with said second solvent.

18. A process for producing polymers of beta-lactams having a hydrogen atom at the nitrogen atom thereof and having 0 to 4 substituents on the alpha and beta carbon atoms thereof containing up to 15 carbon atoms which may comprise a ring including said alpha and beta carbon atoms, and up to 50% by weight of higher lactams, said process comprising establishing a polymerization reaction medium comprising an inert solvent dispersion of a basic catalyst, said catalyst dispersion being emulsified in a different second solvent which when mixed with the solvent of the catalyst dispersion forms two phases, feeding one or more of said beta-lactams slowly to said polymerization reaction medium and maintaining said reaction medium at $-15°$ to $120°$ C. to cause said beta-lactams to polymerize.

19. A process according to claim 18 wherein the beta-lactams to be polymerized are completely miscible with said second solvent.

References Cited
UNITED STATES PATENTS 3,417,163   12/1968   Beermann et al. _____ 260—857

WILLIAM H. SHORT, Primary Examiner

L. M. PHYNES, Assistant Examiner

U.S. Cl. X.R.

260—30.2, 30.6, 30.8, 32.6